(No Model.)

R. M. HUNTER.
ELECTRICAL MEASURING INSTRUMENT.

No. 517,162. Patented Mar. 27, 1894.

Attest
H. L. Motherwell
Harry Plumb Jr.

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRICAL MEASURING-INSTRUMENT.

SPECIFICATION forming part of Letters Patent No. 517,162, dated March 27, 1894.

Application filed March 24, 1893. Renewed February 27, 1894. Serial No. 501,730. (No model.)

*To all whom it may concern:*

Be it known that I, RUDOLPH M. HUNTER, of the city and county of Philadelphia and State of Pennsylvania, have invented an Improvement in Electrical Measuring-Instruments, of which the following is a specification.

My invention has reference to electrical measuring instruments, and consists of certain improvements which are fully set forth in the following specification and shown in the accompanying drawings which form a part thereof.

This application, Case No. 247, comprehends certain improvements in that class of electrical measuring instruments which employs a pointer or indicator moved under the influence of an expansible body whose expansibility is dependent upon the passage of the electric current to be measured.

In carrying out my invention, I provide a pivoted frame which is directly operated by an expansible body over which an electric current is passed. Secured to this frame is a compensating pointer or needle so arranged that for variations in atmospheric temperature surrounding the instrument the pointer will be moved under the influence of the expansible body in such a manner that the measuring instrument will be absolutely self compensating and accurate. The minor details of construction are immaterial to the general principles of the invention.

In the illustration accompanying this specification I have shown a construction which I have found in practice excellently adapted for the purposes of the improvement.

Figure 1:
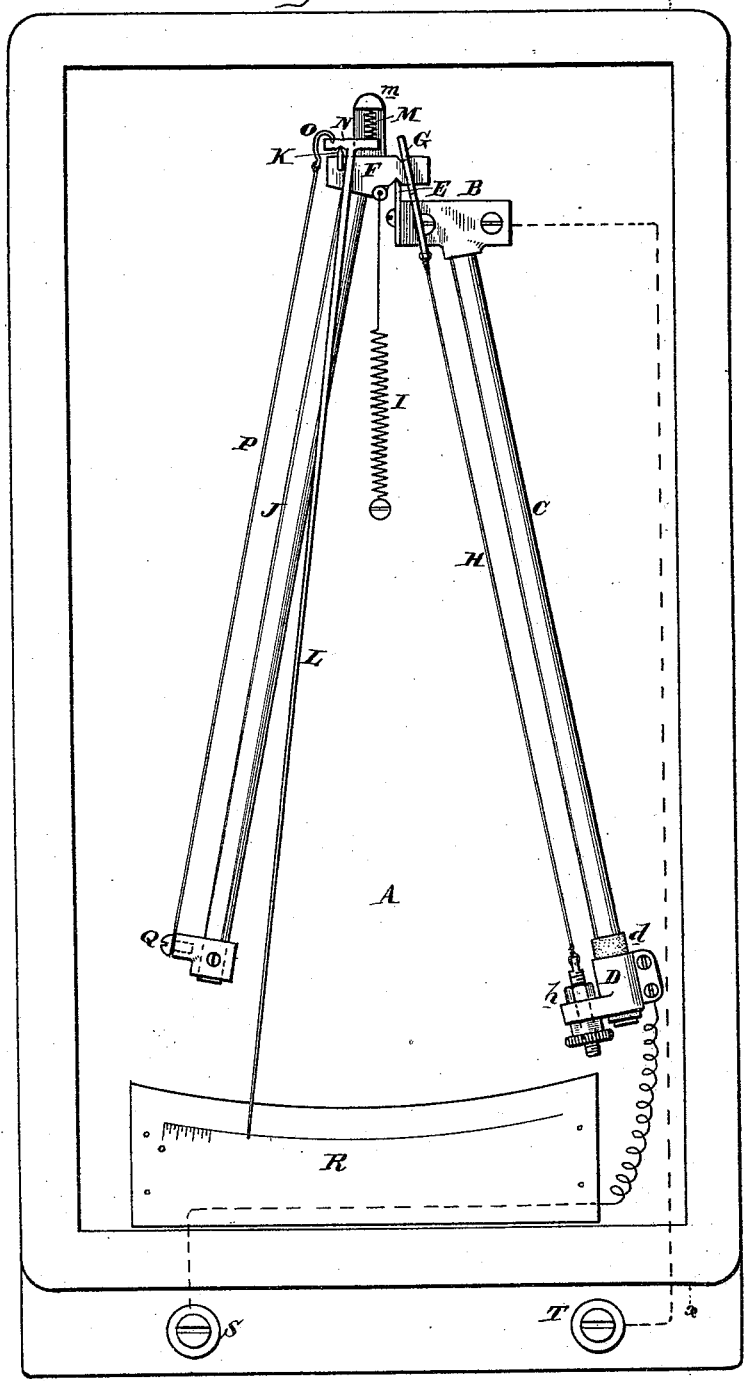
Figure 2:
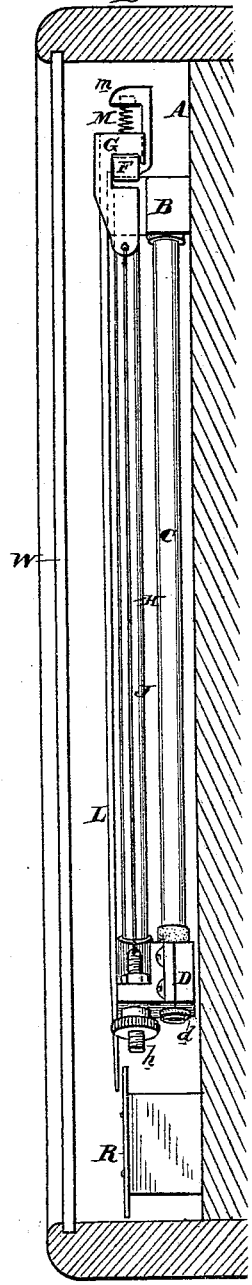

Referring to the drawings, Figure 1 is a front elevation of an electric measuring instrument embodying my invention, and Fig. 2 is a sectional elevation of same on line $x$—$x$.

A is a frame of the instrument and may be made of wood or other material.

B is a block firmly secured to the frame of the instrument and carries a pivot or knife edge E.

Secured to the block B and projecting downwardly is an arm C carrying at its lower end a clamp D securely held in position upon the said arm but insulated therefrom at $d$. The block B is electrically connected with one binding post F and the clamp D is electrically connected with the other binding post S of the instrument.

F is a block which is pivoted upon the knife edge E and is provided with a long arm J corresponding to the arm C.

H is an expansible body of any suitable construction preferably in the form of a wire of German silver, platinum, or other material adapted to the purpose, and is connected at one end by an adjustable device $h$ to the clamp D, and is provided at the other end with a knife edge G working upon a V groove in the head F. A spring I may be employed to hold the head F firmly upon the knife edge E and assist the weight of the arm J to keep the expansible body H under tension.

L is the pointer, and is adapted to traverse a scale R fixed to the frame A. This pointer L is provided at the top with a head N which is pivoted to the head F at K.

Upon one side of the pivot K is a connection O with a wire P, the lower end of which is connected at Q with the bottom of the arm J. The length of the wire P and the wire H are substantially equal, as is also the leverage under which the said parts operate upon the movable heads. A spring M is interposed between the head N and abutment $m$ carried by the head F, the function of which is to keep the pointer upon its pivot and the compensating wire P under tension. If the arms J and C are of the same material and of the same length, the wires P and H should also be of the same material and same length; but if these vary in composition, then the relative lengths should be in accordance with the coefficients of expansion. It is also evident that with the same materials the lengths may vary if the leverages are materially varied.

In operation, the current is caused to traverse the wire H, and as it expands, the spring I assisted by the weight of the arm J causes the pointer L to traverse the scale R. No current traverses the wire P. If the temperature surrounding the instrument varies, the tendency to vary the length of the wire H and thereby move the pointer L will be counteracted by the corresponding tendency to vary the length of the compensating wire P and the movement of the pointer thereby in the opposite direction. Under the combined actions of the two expansible bodies P and H the pointer will be unaffected by atmospheric changes of temperature. If the material composing the parts H and C is the same, then there would be practically no requirement for compensation in the pointer as the expansion which takes place in H would be compensated for by the expansion in the parts C. In practice, however, it is more desirable to make the arms C of brass or iron and make the expansion wire H of German silver, silicon bronze, or platinum which have different co-efficients of expansion, and therefore it becomes necessary to provide some additional means for having compensation to maintain the pointer against action under the influence of the varying atmospheric temperature.

Considering my invention as an entirety, it may be assumed that the pointer device as a unit is found in the parts F, J, P, K, O, N, M, m and L and may be considered as self compensating. The instrument would, therefore, consist of a frame upon which a pointer device is pivoted or movably supported, an expansion body affected by the passage of an electric current to move the pointer device, and a self compensating pointer device which shall operate under the varying atmospheric changes of temperature to compensate and make the instrument accurate under all conditions of working.

The instrument may be inclosed by a glass plate W to keep out dust and dirt.

I do not confine myself to the details of construction herein set out as they may be modified in various ways without departing from the principles of my invention.

What I claim as new, and desire to secure by Letters Patent, is—

1. In an instrument for measuring electrical currents, the combination of a frame, a movable self compensating pointer device movably connected to move bodily on the frame, and an expansible body independent of the compensating device over which an electrical current is passed connected to the frame and pointer device whereby the pointer is moved under the influence of an electric current but is not affected by variations of the temperature of the surrounding atmosphere.

2. In an instrument for measuring electrical currents, the combination of a frame, a movable self compensating pointer device movably connected to the frame, and free to swing about a pivot thereon an expansible body over which an electrical current is passed independent of the compensating device connected to the frame and pointer device, a scale over which the pointer moves, and means to adjust the expansible body upon its supporting frame, whereby the pointer is moved under the influence of an electric current but is not affected by variations of the temperature of the surrounding atmosphere.

3. In an instrument for measuring electrical currents, the combination of a stationary frame a self compensating pointer device movably connected or pivoted to said stationary frame, and movable as a unit a spring device independent of the compensating device to move the pointer in one direction, and an expansible conductor independent of the compensating device connected at one end with the pointer device and at the other end with the stationary frame, and electric circuits connecting with the expansible conductor whereby the pointer will be moved under the influence of a current passing over the expansible conductor but unaffected by the variations in the temperature of the surrounding atmosphere.

4. In an instrument for measuring electrical currents, the combination of a stationary frame a self compensating pointer device movably connected or pivoted to said stationary frame, and movable as a unit a spring device independent of the compensating device to move the pointer in one direction, an expansion wire independent of the compensating device connected at one end with the pointer device and at the other end with the stationary frame, electric circuits connecting with the wire, and an adjusting device carried by the stationary frame for adjusting the expansion wire bodily in the direction of its length, whereby the pointer will be moved under the influence of a current passing over the expansion wire but unaffected by the variations in the temperature of the surrounding atmosphere.

5. In an instrument for measuring electrical currents, the combination of a stationary frame, a pivoted structure carried by the said stationary frame, an expansible body connected at one end to the pivoted frame and at the other end to the stationary frame and over which an electric current to be measured is passed, a movable pointer movably connected with the pivoted frame, and a compensating body connected to the pointer and to the movable frame.

6. In an instrument for measuring electrical currents, the combination of a stationary frame, a pivoted structure carried by said stationary frame, an expansible body connected at one end to the pivoted frame and at the other end to the stationary frame and over which an electric current to be measured is passed, a movable pointer movably connected with the pivoted frame, a compensating body connected to the pointer and to the movable frame, and a spring connecting with the pivoted frame for moving it under the control of the expansible body.

7. In an instrument for measuring electrical currents, the combination of a stationary frame, a pivoted frame movably connected thereto, an expansion wire connected between the pivoted frame and the stationary frame over which the electric current to be measured passes, a pointer pivoted to the pivoted frame, a spring to move the pointer in one direction, and a compensating wire connecting the pointer with the pivoted frame to move it in the other direction.

8. In an instrument for measuring electrical currents, the combination of a stationary frame, a pivoted frame movably connected thereto, an expansion wire connected between the pivoted frame and the stationary frame over which the electric current to be measured passes, a pointer pivoted to the pivoted frame, a spring to move the pointer in one direction, a compensating wire connecting the pointer with the pivoted frame, a scale over which the pointer moves, a spring to move the pivoted frame under the control of the expansion wire, and means to adjust the expansion wire upon its stationary frame.

9. The combination of a fixed frame, movable support pivoted or movably connected to the fixed frame, an expansible body connected between the fixed frame and movable support over which an electric current passes to be measured, and a compensating pointer device moved by the movable support and carried by it whereby the free end of the pointer may have a compensating movement independent of the movement of the movable frame.

In testimony of which invention I have hereunto set my hand.

R. M. HUNTER.

Witnesses:
   ERNEST HOWARD HUNTER,
   HELEN L. MOTHERWELL.